United States Patent
Caldwell (10) Patent No.: US 8,064,541 B1
(45) Date of Patent: Nov. 22, 2011

(54) HYPER PHASE SHIFT KEYING MODULATION

(75) Inventor: James Caldwell, Monterey, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 528 days.

(21) Appl. No.: 12/350,703

(22) Filed: Jan. 8, 2009

Related U.S. Application Data (60) Provisional application No. 61/114,413, filed on Nov. 13, 2008.

(51) Int. Cl.
H04L 27/20 (2006.01)
(52) U.S. Cl. .................................. 375/308
(58) Field of Classification Search .......... 375/279, 375/280, 281, 283, 308, 322, 323, 329, 330, 375/331, 332; 455/23, 42, 205; 370/215
See application file for complete search history.

(56) References Cited

OTHER PUBLICATIONS

Caldwell, J.; Tummala, M.; , "Hyper Phase Shift Keying (HPSK) Modulation," Signals, Systems and Computers, 2007, ACSSC 2007. Conference Record of the Forty-First Asilomar Conference on, pp. 1000-1004, Nov. 4-7, 2007. [retrieved on Aug. 10, 2010 ]. Retrieved from the Internet: <URL: http://ieeexplore.ieee.org/stamp/stamp.jsp?tp=&arnumber=4487371&isnumber=4487143>.
Caldwell, J.; Robertson, C.; , "Long Block Length Reed Solomon Coded M-ary Hyper Phase-shift Keying," Signals, Systems and Computers, 2008 42nd Asilomar Conference on, pp. 413-417, Oct. 26-29, 2008. [retrieved on Aug. 8, 2010]. Retrieved from the Internet: <URL: http:ieeexplore.ieee.org/stamp/stamp.jsp?tp=&arnumber=5074437&isnumber=5074342>.
Caldwell, J.; Robertson, C.; , "Reed Solomon Coded M-ary Hyper Phase-Shift Keying," Military Communications Conference, 2008. MILCOM 2008. IEEE, pp. 1-6, Nov. 16-19, 2008. [retrieved on Aug. 9, 2010]. Retrieved from the Internet: <URL: http://ieeexplore.ieee.org/stamp/stampjsp?tp=&arnumber=4753300&isnumber=4753027>.

*Primary Examiner* — Sam K Ahn
(74) *Attorney, Agent, or Firm* — Donald E. Lincoln; Lisa A. Norris (57) ABSTRACT

A communications system and method for transmitting digital information includes arranging a modulator to have an input bit stream of binary data and arranging a signal generator to generate four orthonormal hyper phase shift keying (HPSK) basis functions that are periodic functions with a duration T. A bit to symbol mapper is arranged to combine the bit stream and the HPSK basis functions to form a succession of 4-bit HPSK symbols for 16-HPSK, 5-bit HPSK symbols for 32-HPSK or 6-bit HPSK symbols for 64-HPSK, and a transmitter is arranged to transmit signals indicative of the HPSK symbols. A receiver is arranged to receive the signals from the transmitter and the HPSK symbols are demodulated with the HPSK basis functions to reproduce the bit stream of binary data.

10 Claims, 7 Drawing Sheets

HYPER PHASE SHIFT KEYING MODULATION

CROSS REFERENCE TO RELATED APPLICATION

This application claims the benefit of U.S. Provisional Application No. 61/114,413, filed Nov. 13, 2008 which is hereby incorporated in its entirety by reference.

BACKGROUND OF THE INVENTION

1. Field of the Invention

This invention relates generally to digital communications and particularly to signal modulation techniques. Still more particularly, this invention relates to phase shift keying, which is a digital modulation scheme that conveys data by changing, or modulating, the phase of a reference signal.

2. Description of the Related Art

In telecommunications, modulation is the process of varying a periodic waveform in order to use that signal to convey a message or to transmit information. Any digital modulation scheme uses a finite number of distinct signals to represent digital data. Phase shift keying (PSK) is a digital modulation scheme that conveys data by changing, or modulating, the phase of a reference signal (the carrier wave). PSK uses a finite number of phases, each assigned a unique pattern of binary bits. Usually each phase encodes an equal number of bits. Each pattern of bits forms the symbol that is represented by the particular phase. In digital communications, a symbol is the smallest unit of data transmitted at one time.

Traditional digital modulation techniques include binary phase shift keying and quadrature phase shift keying. Binary phase shift keying (BPSK) has only one basis function, which is expressed as $$\phi(t) = \sqrt{\frac{2}{T}} \cos(2\pi f_c t), \tag{1}$$

where $f_c$ is the carrier wave frequency and T represents the symbol duration and the basis function is defined only for times between 0 and T. The BPSK waveforms, $s_1(t)=-s_2(t)$, are represented as $$s_1(t) = \sqrt{E_b}\phi(t) = -s_2(t), \tag{2}$$

where $E_b$ is the energy per bit.

In the presence of zero mean additive white Gaussian noise (AWGN) with a variance of $N_o/2$, the probability of bit error using maximum likelihood (ML) detection is $$P_b = Q\left(\sqrt{\frac{2E_b}{N_o}}\right), \tag{3}$$

where $E_b$ is the energy per bit, and the Q function is $$Q(x) = \frac{1}{\sqrt{2\pi}} \int_0^\infty e^{\frac{-x^2}{2}} dx. \tag{4}$$

M-ary phase shift keying (MPSK) uses two orthonormal basis functions $$\phi_1(t) = \frac{A}{\sqrt{E_s}} \cos(2\pi f_c t) \tag{5}$$

and $$\phi_2(t) = -\frac{A}{\sqrt{E_1}} \sin(2\pi f_c t), \tag{6}$$

where A is the amplitude, $f_c = m/T$ with m being a positive integer and the basis functions are defined only for time values between 0 and T. The constraint on the frequency allows the two basis functions to be orthogonal to each other.

Additionally, $E_s$ represents the energy per symbol and equals $A^2 T/2$. The signals $s_n(t)$, where $n = 1, 2, \ldots, M$ are written as $$s_n(t) = \sqrt{E_s} \left[ \cos\left(\frac{\pi}{M}(2n-1)\right)\phi_1(t) + \sin\left(\frac{\pi}{M}(2n-1)\right)\phi_2(t) \right]. \tag{7}$$

For quadrature phase shift keying (QPSK) where M=4, the probability of bit error using ML detection in AWGN is the same as is the same as in Equation (3) because QPSK in effect is two independent BPSK channels. Note that even though the bit error rates are identical, QPSK has twice the bandwidth efficiency of BPSK.

The bit error probability for M-PSK in general is $$P_b = \frac{2}{\log_2 M} Q\left(\sin\left(\frac{\pi}{M}\right)\sqrt{\log_2 M \frac{2E_b}{N_o}}\right). \tag{8}$$

Equation (8) is accurate when gray coding is used to code adjacent symbols.

Another commonly used modulation is M-quadrature modulation (QAM), which is simply amplitude modulation over two quadrature channels. The bit error probability for M-QAM in general is $$P_b = \frac{4\left(1 - \frac{1}{\sqrt{M}}\right)}{\log_2 M} Q\left(\sqrt{\frac{3\log_2 M E_b}{(M-1)N_o}}\right). \tag{9}$$

In the simplest modulation schemes such as binary phase-shift keying, only one bit of data (i.e., a 0 or 1) is transmitted at a time depending on the phase of the transmitted signal. However, in a more complex scheme such as 16-QAM, four bits of data are transmitted simultaneously, resulting in a symbol rate (or baud rate) that is equal to one quarter of the bit rate.

Owing to PSK's simplicity, it is widely used in existing technologies. The most popular wireless local area network (LAN) wireless standard, IEEE 802.11b uses a variety of different PSK techniques depending on the data-rate required. At the basic-rate of 1 Mbit/s, it uses differential BPSK. To provide the extended-rate of 2 Mbit/s, DQPSK is used. In reaching 5.5 Mbit/s and the full-rate of 11 Mbit/s, QPSK is employed coupled with complementary code keying. The higher-speed wireless LAN standard, IEEE 802.11g has eight data rates: 6, 9, 12, 18, 24, 36, 48 and 54 Mbit/s. The 6 and 9 Mbit/s modes use BPSK. The 12 and 18 Mbit/s modes use QPSK. The fastest four modes use forms of quadrature amplitude modulation.

Because of its simplicity BPSK is appropriate for low-cost passive transmitters, and is used in radio frequency identification (RFID) standards such as International Organization for Standardization (ISO) 14443 which has been adopted for biometric passports, credit cards such as American Express's Express Pay and many other applications.

SUMMARY OF THE INVENTION

Embodiments in accordance with the invention provide a communications system and method for transmitting digital data using a modulation technique that has a lower error probability than prior art phase shift keying techniques for the same spectral efficiency.

In one embodiment, a communications system includes: a modulator arranged to receive a bit stream of binary data input thereto, the modulator including a signal generator arranged to generate four orthonormal M-hyper phase shift keying (M-HPSK) basis functions that are periodic functions having with a duration T and a bit to symbol mapper for combining the bit stream and the HPSK basis functions to form a succession of 4-bit HPSK symbols for 16-HPSK, 5-bit HPSK symbols for 32-HPSK, or 6-bit HPSK symbols for 64-HPSK; a transmitter connected to the mapper and arranged to receive the HPSK symbols and transmit signals indicative of the HPSK symbols; a receiver arranged to receive the signals indicative of the HPSK symbols from the transmitter; and a demodulator connected to the receiver and arranged to demodulate the HPSK symbols with the HPSK basis functions and reproduce the bit stream of binary data.

In one embodiment, a method for transmitting digital information includes: arranging a modulator to receive a bit stream of binary data input thereto; providing a signal generator arranged to generate four orthonormal M-hyper phase shift keying (M-HPSK) basis functions that are periodic functions with a duration T; providing a bit to symbol mapper for combining the bit stream and the HPSK basis functions to form a succession of 4-bit HPSK symbols for 16-HPSK, 5-bit HPSK symbols for 32-HPSK, or 6-bit HPSK symbols for 64-HPSK; connecting a transmitter to the mapper and arranging the transmitter to receive the HPSK symbols transmit signals indicative of the HPSK symbols; providing a receiver arranged to receive the signals indicative of the HPSK symbols from the transmitter; and demodulating the HPSK symbols with the HPSK basis functions to reproduce the bit stream of binary data.

Embodiments in accordance with the invention are best understood by reference to the following detailed description when read in conjunction with the accompanying drawings.

DETAILED DESCRIPTION OF THE INVENTION

Hyper Phase shift keying (HPSK) according to the present invention uses four orthonormal basis functions to modulate the information bits. The basis functions are:

$$\phi_1(t) = \frac{A}{\sqrt{E_s}} \cos(2\pi(f_c + 1/(2T))t) \tag{10}$$

$$\phi_2(t) = \frac{A}{\sqrt{E_s}} \sin(2\pi(f_c + 1/(2T))t) \tag{11}$$

$$\phi_3(t) = \frac{A}{\sqrt{E_s}} \sin(2\pi(f_c - 1/(2T))t) \tag{12}$$

$$\phi_4(t) = \frac{A}{\sqrt{E_s}} \cos(2\pi(f_c - 1/(2T))t) \tag{13}$$

where T is the symbol duration, $$E_s = \frac{A^2 T}{2}$$

is the energy per symbol transmitted and the basis functions are defined for time values between 0 and T and $$f_c = \frac{k}{T}$$

with k being a positive integer.

Orthonormal functions have two qualities: they are normalized to have unit energy and they are mutually orthogonal with each other. The following derivation shows the mutual orthogonality of the four HPSK basis functions of Equations (10)-(13). The orthogonality of the basis functions $\phi_2$ and $\phi_1$ can be shown by noting that $$\int_0^T \phi_1(t)\phi_2(t)dt = \quad (14)$$

$$A^2 \int_0^T \frac{\cos(2\pi(f_c + 1/(2T))t)\sin(2\pi(f_c + 1/(2T))t)}{E_s} dt$$

which, using some trigonometric identities, may be written as $$\int_0^T \phi_1(t)\phi_2(t)dt = A^2 \int_0^T \frac{\sin(4\pi(f_c + 1/2T)t)}{2E_s} dt = 0. \quad (15)$$

Equation (15) equals zero (i.e. the functions $\phi_2$ and $\phi_1$ are orthogonal) under the condition that $$f_c = \frac{k}{T}$$

where k is a positive integer. Even if the carrier frequency does not exactly meet the condition, the first two basis functions are still approximately orthogonal.

In a similar manner the rest of the basis functions are shown to be orthogonal.

$$\int_0^T \phi_1(t)\phi_3(t)dt = A^2 \int_0^T \frac{\cos(4\pi f_c t) + \cos(2\pi t/T)}{2E_s} dt = 0 \quad (16)$$

$$\int_0^T \phi_1(t)\phi_4(t)dt = A^2 \int_0^T \frac{\sin(4\pi f_c t) - \sin(2\pi t/T)}{2E_s} dt = 0 \quad (17)$$

$$\int_0^T \phi_2(t)\phi_3(t)dt = \frac{A^2}{E_s} \int_0^T \frac{\sin(4\pi f_c t) - \sin(2\pi t/T)}{2} dt = 0 \quad (18)$$

$$\int_0^T \phi_2(t)\phi_4(t)dt = \frac{A^2}{E_s} \int_0^T \frac{\cos(2\pi t/T) - \cos(4\pi f_c t)}{2} dt = 0 \quad (19)$$

$$\int_0^T \phi_3(t)\phi_4(t)dt = \frac{A^2}{E_s} \int_0^T \frac{\sin(4\pi f_c t)}{2} dt = 0 \quad (20)$$

Equations (16) through (20) also equal zero under the same carrier frequency condition specified above.

HPSK has a positive frequency magnitude response that is proportion to two sin c functions sin c(x) centered at the carrier frequency minus half the symbol rate and the carrier frequency plus half the symbol rate where $$\sin c(x) = \frac{\sin(\pi x)}{\pi x}, \quad (21)$$

and the null-to-null bandwidth of a sin c function is $$\frac{2}{T} = 2R.$$

As a result, HPSK requires a null-to-null bandwidth of 3R.

HPSK takes $k=\log_2 M$ bits at a time and passes them through a serial to parallel converter. Just as in MPSK, the symbols are coded at various phases in the signal space. However, in HPSK the symbols are coded at various phases spaced around the surface of a four dimensional hypersphere. For example, the waveform is determined by a basis function weighting values $$s_n(t) = \sqrt{E_s/4}[s_{n1}\phi_1(t) + s_{n2}\phi_2(t) + s_{n3}\phi_3(t) + s_{n4}\phi_4(t)] \quad (22)$$

where $s_{n1}$, $s_{n2}$, $s_{n3}$, and $s_{n4}$ convey the information to be transmitted as shown in Table 1 for M=16, Table 2 for M=32, and Table 3 for M=64. The $\sqrt{4/3}$ is approximated as 1.155 in Table 2. The $\sqrt{24/9}$ is approximated as 1.633 in Table 3.

TABLE 1

16-HPSK Bit to Symbol Mapping Values

| Bit Stream | $S_{n1}$ | $S_{n2}$ | $S_{n3}$ | $S_{n4}$ |
|---|---|---|---|---|
| 0000 | −1 | −1 | −1 | −1 |
| 0001 | −1 | −1 | −1 | 1 |
| 0011 | −1 | −1 | 1 | 1 |
| 0010 | −1 | −1 | 1 | −1 |
| 0110 | −1 | 1 | 1 | −1 |
| 0111 | −1 | 1 | 1 | 1 |
| 0101 | −1 | 1 | −1 | 1 |
| 0100 | −1 | 1 | −1 | −1 |
| 1100 | 1 | 1 | −1 | −1 |
| 1101 | 1 | 1 | −1 | 1 |
| 1111 | 1 | 1 | 1 | 1 |
| 1110 | 1 | 1 | 1 | −1 |
| 1010 | 1 | −1 | 1 | −1 |
| 1011 | 1 | −1 | 1 | 1 |
| 1001 | 1 | −1 | −1 | 1 |
| 1000 | 1 | −1 | −1 | −1 |

TABLE 2

Bit-to-symbol mapping values for 32-HPSK.

| Bit Stream | $S_{n1}$ | $S_{n2}$ | $S_{n3}$ | $S_{n4}$ |
|---|---|---|---|---|
| 00000 | 1.155 | 1.155 | 1.155 | 0 |
| 00001 | 1.155 | 1.155 | 0 | 1.155 |
| 00011 | 1.155 | 0 | 1.155 | 1.155 |
| 00010 | 0 | 1.155 | 1.155 | 1.155 |
| 00110 | −1.155 | 1.155 | 1.155 | 0 |
| 00111 | −1.155 | 1.155 | 0 | −1.155 |
| 00101 | −1.155 | 0 | −1.155 | −1.155 |
| 00100 | 0 | 1.155 | −1.155 | −1.155 |
| 01100 | −1.155 | 1.155 | −1.155 | 0 |
| 01101 | −1.155 | 1.155 | 0 | 1.155 |
| 01111 | −1.155 | 0 | 1.155 | 1.155 |
| 01110 | 0 | −1.155 | 1.155 | 1.155 |
| 01010 | 1.155 | 1.155 | 1.155 | 0 |
| 01011 | 1.155 | −1.155 | 0 | 1.155 |
| 01001 | 1.155 | 0 | −1.155 | 1.155 |
| 01000 | 0 | −1.155 | −1.155 | 1.155 |
| 11000 | 1.155 | −1.155 | −1.155 | 0 |
| 11001 | 1.155 | −1.155 | 0 | −1.155 |
| 11011 | 1.155 | 0 | 1.155 | −1.155 |
| 11010 | 0 | −1.155 | 1.155 | −1.155 |
| 11110 | −1.155 | −1.155 | 1.155 | 0 |
| 11111 | −1.155 | −1.155 | 0 | 1.155 |
| 11101 | −1.155 | 0 | −1.155 | 1.155 |
| 11100 | 0 | 1.155 | −1.155 | 1.155 |
| 10100 | 1.155 | 1.155 | −1.155 | 0 |
| 10101 | 1.155 | 1.155 | 0 | −1.155 |
| 10111 | 1.155 | 0 | −1.155 | −1.155 |
| 10110 | 0 | −1.155 | −1.155 | −1.155 |
| 10010 | −1.155 | −1.155 | −1.155 | 0 |
| 10011 | −1.155 | −1.155 | 0 | −1.155 |
| 10001 | −1.155 | 0 | 1.155 | −1.155 |
| 10000 | 0 | 1.155 | 1.155 | −1.155 |

TABLE 3

Bit-to-symbol mapping values for 64-HPSK.

| Bit Stream | $S_{n1}$ | $S_{n2}$ | $S_{n3}$ | $S_{n4}$ |
|---|---|---|---|---|
| 000000 | 1.633 | 2/3 | 2/3 | 2/3 |
| 000001 | 1.633 | 2/3 | 2/3 | −2/3 |
| 000011 | 1.633 | 2/3 | −2/3 | −2/3 |
| 000010 | 1.633 | 2/3 | −2/3 | 2/3 |
| 000110 | 1.633 | −2/3 | −2/3 | 2/3 |
| 000111 | 1.633 | −2/3 | −2/3 | −2/3 |
| 000101 | 1.633 | −2/3 | 2/3 | −2/3 |
| 000100 | 1.633 | −2/3 | 2/3 | 2/3 |
| 001100 | 2/3 | −1.633 | 2/3 | 2/3 |
| 001101 | 2/3 | −1.633 | 2/3 | −2/3 |
| 001111 | 2/3 | −1.633 | −2/3 | −2/3 |
| 001110 | 2/3 | −1.633 | −2/3 | 2/3 |
| 001010 | −2/3 | −1.633 | −2/3 | 2/3 |
| 001011 | −2/3 | −1.633 | −2/3 | −2/3 |
| 001001 | −2/3 | −1.633 | 2/3 | −2/3 |
| 001000 | −2/3 | −1.633 | 2/3 | 2/3 |
| 011000 | −1.633 | −2/3 | 2/3 | 2/3 |
| 011001 | −1.633 | −2/3 | 2/3 | −2/3 |
| 011011 | −1.633 | −2/3 | −2/3 | −2/3 |
| 011010 | −1.633 | −2/3 | −2/3 | 2/3 |
| 011110 | −1.633 | 2/3 | −2/3 | 2/3 |
| 011111 | −1.633 | 2/3 | −2/3 | −2/3 |
| 011101 | −1.633 | 2/3 | 2/3 | −2/3 |
| 011100 | −1.633 | 2/3 | 2/3 | 2/3 |
| 010100 | −2/3 | 2/3 | 1.633 | 2/3 |
| 010101 | −2/3 | 2/3 | 1.633 | −2/3 |
| 010111 | −2/3 | −2/3 | 1.633 | −2/3 |
| 010110 | −2/3 | −2/3 | 1.633 | 2/3 |
| 010010 | 2/3 | −2/3 | 1.633 | 2/3 |
| 010011 | 2/3 | −2/3 | 1.633 | −2/3 |
| 010001 | 2/3 | 2/3 | 1.633 | −2/3 |
| 010000 | 2/3 | 2/3 | 1.633 | 2/3 |
| 110000 | 2/3 | 1.633 | 2/3 | 2/3 |
| 110001 | 2/3 | 1.633 | 2/3 | −2/3 |
| 110011 | 2/3 | 1.633 | −2/3 | −2/3 |
| 110010 | 2/3 | 1.633 | −2/3 | 2/3 |
| 110110 | −2/3 | 1.633 | −2/3 | 2/3 |
| 110111 | −2/3 | 1.633 | −2/3 | −2/3 |
| 110101 | −2/3 | 1.633 | 2/3 | −2/3 |
| 110100 | −2/3 | 1.633 | 2/3 | 2/3 |
| 111100 | −2/3 | 2/3 | 2/3 | 1.633 |
| 111101 | −2/3 | 2/3 | −2/3 | 1.633 |
| 111111 | −2/3 | −2/3 | −2/3 | 1.633 |
| 111110 | −2/3 | −2/3 | 2/3 | 1.633 |
| 111010 | 2/3 | 2/3 | 2/3 | 1.633 |
| 111011 | 2/3 | −2/3 | 2/3 | 1.633 |
| 111001 | 2/3 | −2/3 | −2/3 | 1.633 |
| 111000 | 2/3 | 2/3 | −2/3 | 1.633 |
| 101000 | 2/3 | 2/3 | −1.633 | 2/3 |
| 101001 | −2/3 | 2/3 | −1.633 | 2/3 |
| 101011 | −2/3 | −2/3 | −1.633 | 2/3 |
| 101010 | 2/3 | −2/3 | −1.633 | 2/3 |
| 101110 | 2/3 | −2/3 | −1.633 | −2/3 |
| 101111 | −2/3 | −2/3 | −1.633 | −2/3 |
| 101101 | −2/3 | 2/3 | −1.633 | −2/3 |
| 101100 | 2/3 | 2/3 | −1.633 | −2/3 |
| 100100 | 2/3 | 2/3 | −2/3 | −1.633 |
| 100101 | 2/3 | 2/3 | −2/3 | −1.633 |
| 100111 | 2/3 | −2/3 | 2/3 | −1.633 |
| 100110 | 2/3 | 2/3 | 2/3 | −1.633 |
| 100010 | −2/3 | 2/3 | 2/3 | −1.633 |
| 100011 | −2/3 | −2/3 | 2/3 | −1.633 |
| 100001 | −2/3 | −2/3 | −2/3 | −1.633 |
| 100000 | −2/3 | −2/3 | −2/3 | −1.633 |

The binary bit stream values are either one or minus one. The bits that are minus one correspond to zeros, and the bits that are plus one correspond to ones. Then all four basis functions weighted according to Equation (22) are multiplexed together to form the first symbol using either Table 1, Table 2, or Table 3 for M=16, 32, or 64, respectively (i.e. summed together). This multiplexing approach works because all four basis functions are mutually orthonormal. The process is repeated for each symbol.

Figure 1:
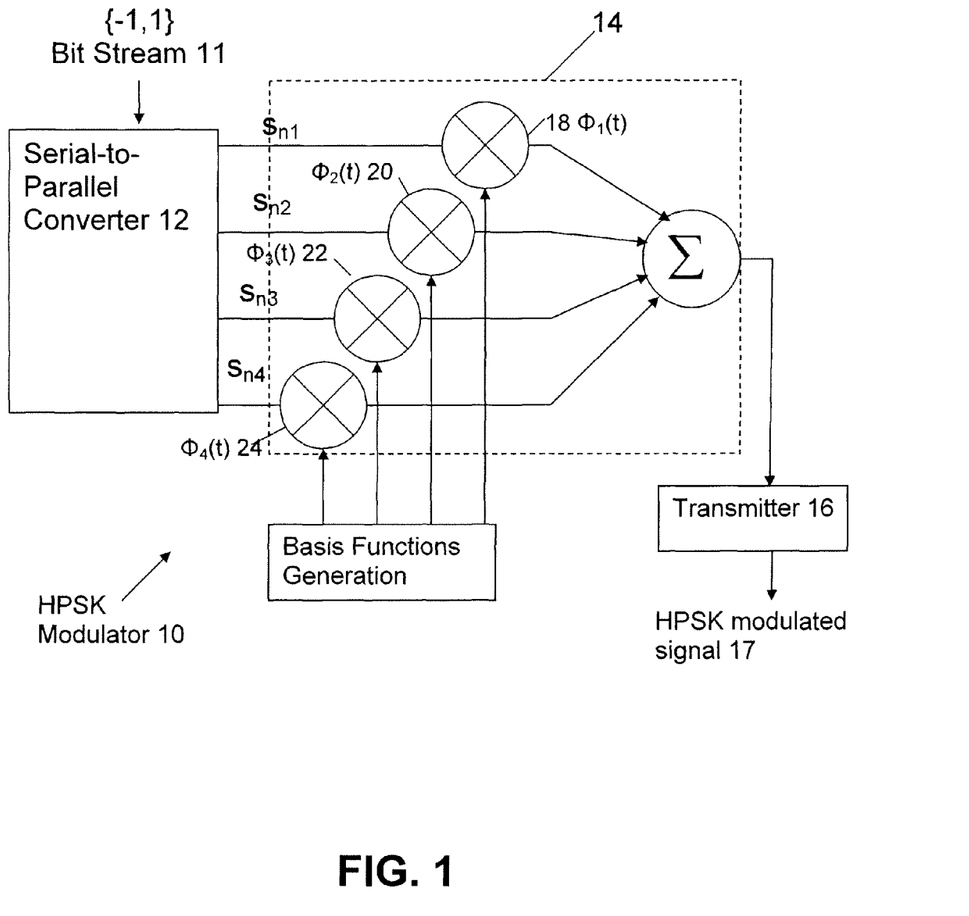
FIG. 1 is a block diagram of an HPSK modulator in accordance with one embodiment.

An example of how an HPSK modulator 10 according to the present invention is implemented is shown in FIG. 1. A bit stream 11 is input to a serial to parallel converter 12. The output of serial to parallel converter 12 is input to a bit to symbol mapper 14 that weights the four HPSK basis functions, shown in FIG. 1 as basis function generators 18, 20, 22, and 24 representing basis functions $\phi_1$ through $\phi_4$, respectively, to form symbols that represent the bit stream according to either Table 1, Table 2, or Table 3. After the summing of the weight basis functions in symbol mapper 14, the symbols are transmitted via a transmitter 16.

Figure 2:
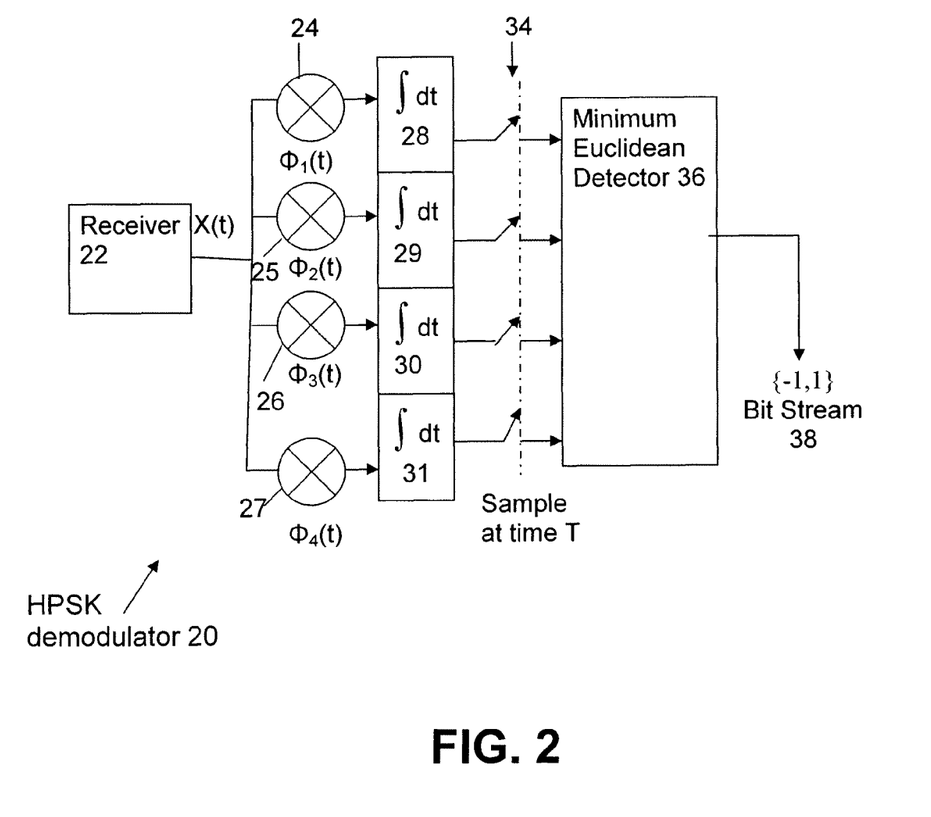
FIG. 2 is a block diagram of an HPSK demodulator in accordance with one embodiment.

FIG. 2 is a block diagram of an HPSK demodulator 20 that may be included in the present invention. A receiver 22 outputs a signal x(t) to an array of multipliers 24-27 that multiply x(t) by the basis functions $\phi_1$ through $\phi_4$, respectively. The functions x(t)$\phi_1$(t), x(t)$\phi_2$(t), x(t)$\phi_3$(t) and x(t)$\phi_4$(t) are input to an array of correlators 28-31, respectively. The correlators 28-31 provide their respective integrated signals to a switch array 34, which closes at time T to provide the four signals to a minimum Euclidean distance detector 36. The minimum Euclidean distance detector 36 selects the signal input that is closest to the received signal and forms a bit stream 38.

At the demodulator 20 each symbol is correlated with all four basis functions (i.e. there are four correlators, although four matched filters would function in the same way) and sampled at time T. The minimum Euclidean distance (MED) detector estimates the signal that is sent based on the principle that the received signal should be closest to the sent signal. Therefore, the MED detector estimates the transmitted symbol that is closest in the four-dimensional Euclidean space to the received signal. The process then repeats itself for the next symbol and so on. This MED detection procedure results in the lowest bit error probability for AWGN.

To determine the bit error probability, the probability of correct symbol estimation is derived first. For M=16, the probability of estimating the correct symbol i given that symbol i was transmitted is $$P(c \mid s_i) = \int_{-\sqrt{\frac{E_s}{2}}}^{\infty} f(n_1) dn_1 \ldots \int_{-\sqrt{\frac{E_s}{2}}}^{\infty} f(n_4) dn_4, \quad (21)$$

where the probability density function of the AWGN is $$f(n_i) = \frac{1}{\sqrt{\pi N_c}} e^{-\frac{n_i^2}{N_o}} \quad (22)$$

Since the noise is independent between the four orthogonal demodulator channels, the conditional probability of estimating the correct symbol is $$P(c \mid s_i) = \left(1 - Q\left(\sqrt{\frac{\log_2 M E_b}{2 N_o}}\right)\right)^4. \quad (23)$$

The probability of estimating a correct symbol is $$P(c) = \frac{1}{M} \sum_{i=1}^{M} P(c \mid s_i) \quad (24)$$

for equally likely symbols. Due to symmetry in the HPSK signal constellation, all of the conditional correct probabilities are equal and $P(c)=P(c|s_i)$. The probability of a symbol error is one minus the probability of estimating a correct symbol. Therefore, the bit error probability using a gray code for 16-HPSK is $$P_b = \frac{1}{\log_2 M}\left(1 - \left(1 - Q\left(\frac{\log_2 M E_b}{2N_0}\right)\right)^4\right). \quad (25)$$

Figure 3:
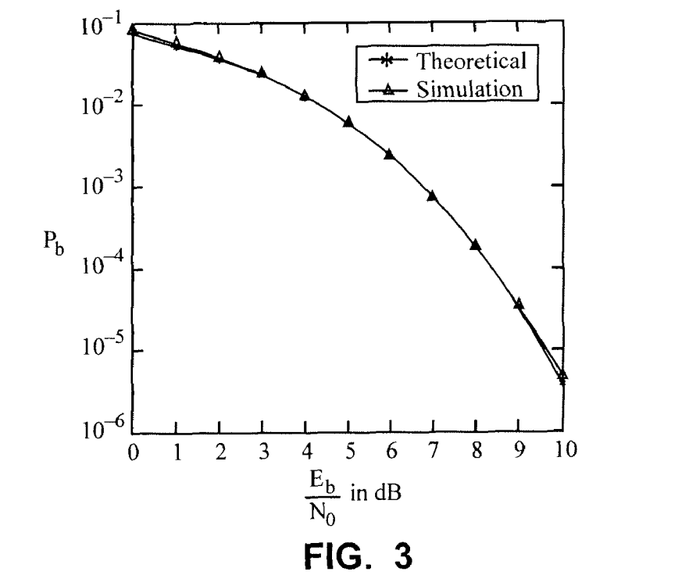
FIG. 3 graphically illustrates the theoretical bit error probability and Monte Carlo simulation results for 16-HPSK in accordance with one embodiment.

This is the 16-HPSK probability of error shown in FIG. 3 using the demodulator shown in FIG. 2 using gray coding as in Table 1.

To determine the probability of bit error for M=32, first the probability of symbol error is approximated by the first term in a tight union bound $$P_s \cong N_n Q\left(\sqrt{\frac{d^2}{2N_0}}\right), \quad (26)$$

where $N_n$ is the number of nearest symbols in the constellation, $d^2$ is the Euclidean distance squared between a symbol and its nearest neighbors, and $N_o$ is the one-sided noise PSD. For 32-HPSK, gray coding is not possible because each symbol has six nearest neighbors, and there are only five bits per symbol. Therefore, an upper bound and a lower bound are derived using (26). Simulation results fall approximately halfway between these two bounds. The Euclidean distance between each of the symbols and its nearest neighbors is $\sqrt{10E_b/3}$. Therefore, an upper bound for 32-HPSK is $$P_b < 6Q\left(\sqrt{\frac{5E_b}{3N_0}}\right). \quad (27)$$

An approximate lower bound for 32-HPSK is achieved if gray coding were possible, and this lower bound is $$P_b > \frac{6}{5}Q\left(\sqrt{\frac{5E_b}{3N_0}}\right). \quad (28)$$

Therefore, a useful approximation for 32-HPSK is the average of (27) and (28):

$$P_b \approx \frac{36}{10}Q\left(\sqrt{\frac{5E_b}{3N_0}}\right). \quad (29)$$

Figure 4:
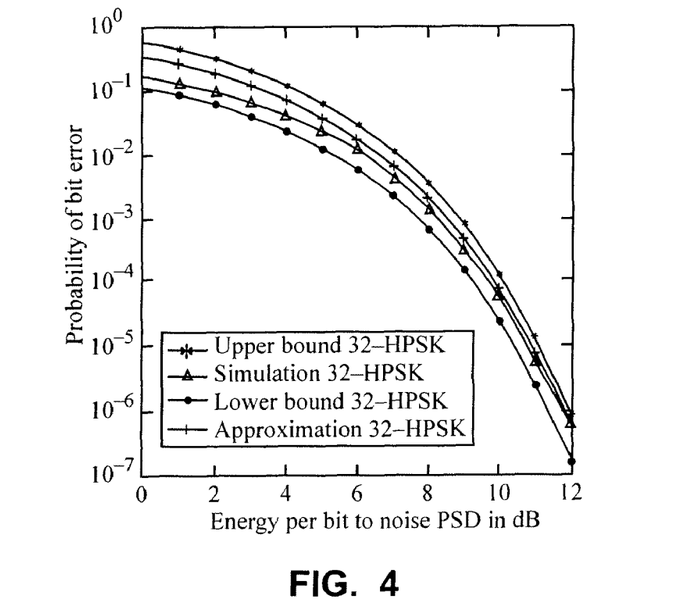
FIG. 4 graphically illustrates Monte Carlo simulation results, the upper bound, the lower bound, and an useful approximation for 32-HPSK in accordance with one embodiment.

Thus (29) is an accurate approximation of the probability of bit error for 32-HPSK when compared to Monte Carlo simulation results where each value of $E_b/N_o$ in dB is simulated for 1000 bit errors in FIG. 4 using the bit to symbol mapper values shown in Table 2. Notice that the approximation is accurate as the probability of bit error approaches $10^{-5}$.

To determine the probability of bit error for M=64, first the probability of symbol error is approximated by the first term in a tight union bound $$P_s \cong N_n Q\left(\sqrt{\frac{d^2}{2N_0}}\right), \quad (30)$$

where $N_n$ is the number of nearest symbols in the constellation, $d^2$ is the Euclidean distance squared between a symbol and its nearest neighbors, and $N_o$ is the one-sided noise PSD. For 64-HPSK, each symbol has three nearest neighbors with a Euclidean distance of $\sqrt{8E_b/3}$ between each symbol. However, each symbol also has three more neighbors that are only slightly farther away, so gray coding is still not possible. The upper bound for 64-HPSK is, therefore, $$P_b < 3Q\left(\sqrt{\frac{4E_b}{3N_0}}\right). \quad (31)$$

The corresponding lower bound for 64-HPSK is $$P_b > \frac{3}{6}Q\left(\sqrt{\frac{4E_b}{3N_0}}\right). \quad (32)$$

A useful approximation for 64-HPSK is the average of (31) and (32):

$$P_b \approx \frac{7}{4}Q\left(\sqrt{\frac{4E_b}{3N_0}}\right). \quad (33)$$

Figure 5:
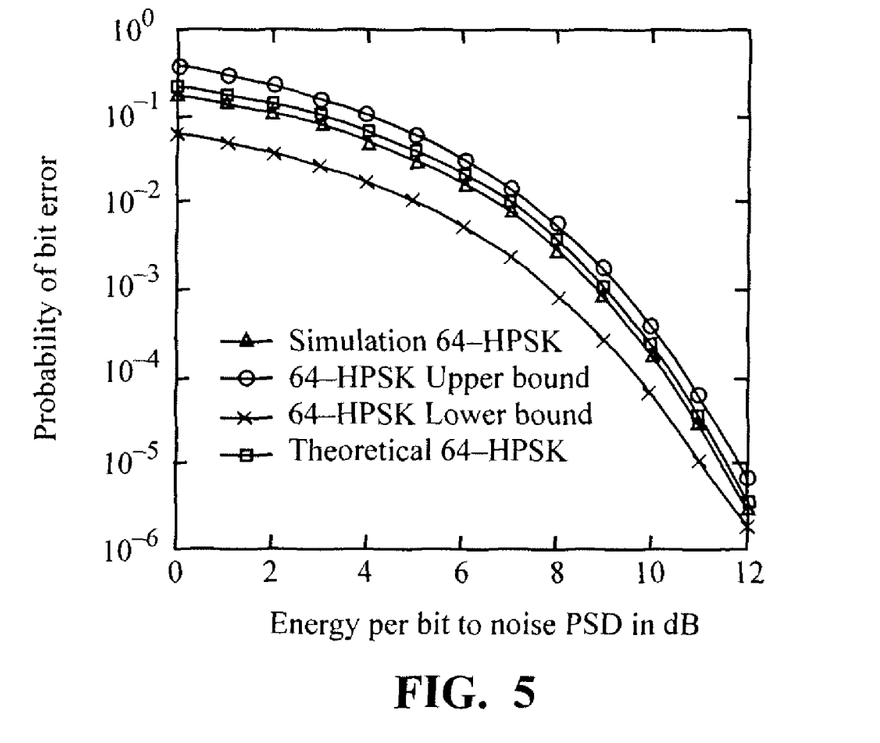
FIG. 5 graphically illustrates Monte Carlo simulation results, the upper bound, the lower bound, and an useful approximation for 64-HPSK in accordance with one embodiment.

Thus (33) is an accurate approximation of the probability of bit error for 64-HPSK when compared to Monte Carlo simulation results where each value of $E_b/N_0$ in dB is simulated for 1000 bit errors in FIG. 5 for the bit to symbol mapper values shown in Table 3. Notice that the approximation is extremely accurate for the probability of bit error $<10^{-2}$.

Figure 6:
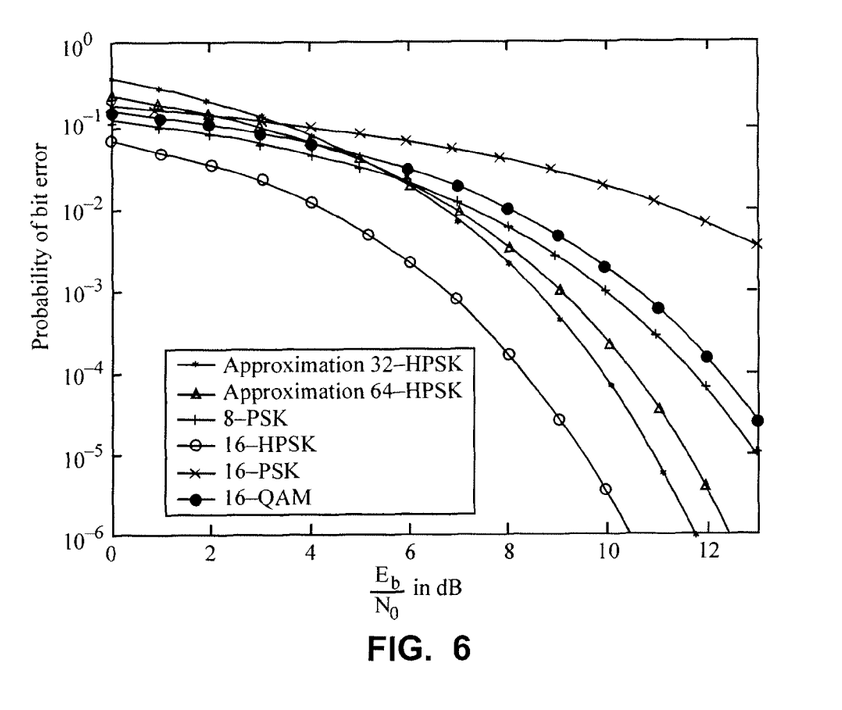
FIG. 6 graphically illustrates the theoretical bit error probabilities for uncoded 16-PSK, 16-QAM, 16-HPSK, and 8-PSK and useful approximations to theoretical bit error probabilities for 32-HPSK and 64-HPSK for the modulation techniques without using error correction codes in accordance with one embodiment.

The 8-PSK, 16-PSK, 16-QAM, 16-HPSK, 32-HPSK, and 64-HPSK modulation techniques are compared using theoretical and Monte Carlo analysis for probability of bit error versus energy per bit to nose power spectral density ratio in FIG. 6. Monte Carlo analysis simulates the probability of bit error many times and averages the results to predict modulation performance. The 64-HPSK modulation technique is shown to have far superior bit error rates than 16-PSK and 16-QAM versus energy per bit to noise power spectral density ratio while having the same spectral efficiency.

Figure 7:
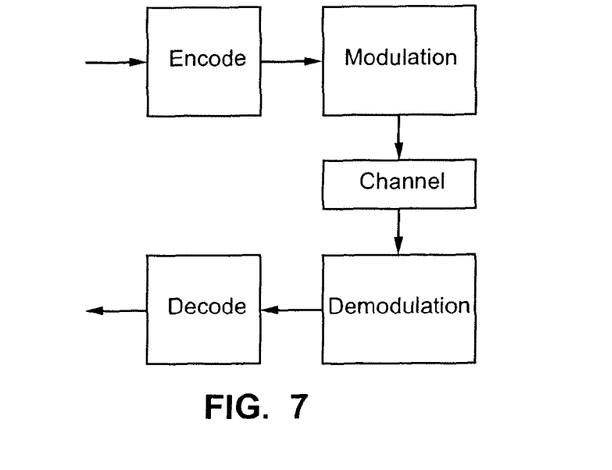
FIG. 7 graphically illustrates an error correction code block diagram in accordance with one embodiment.

Note that HPSK can perform well even when the noise and signal powers are of the same magnitude with the use of error correcting codes. Error correction codes refer to the ordering of input information bit streams so that redundancy is introduced into the information data and errors can be self-corrected after the demodulator. An error correction code block diagram is shown in FIG. 7.

HPSK is an excellent modulation technique for energy-limited scenarios like satellite communication. This is because due to the great distances involved between communication satellites and earth stations, the signal is often received with a degraded signal power. Additionally, HPSK has equal energy symbols, unlike 16-QAM that might cause a satellite amplifier to vary back and forth between saturation and over-saturation, which results in inter-modulation noise.

FIG. 6 shows the theoretical bit error probabilities for uncoded 16-PSK, 16-QAM, 16-HPSK, 8-PSK, 32-HPSK, and 64-HPSK. HPSK clearly performs much better than the other traditional modulation techniques. This improvement in bit error probability occurs because of the four degrees of freedom that are possible using HPSK. Having four degrees of freedom does however result in increased receiver/demodulator complexity as shown in FIG. 2. FIG. 6 shows bit error probabilities for the modulation techniques without using error correction codes. Further improvements in power-limited environments can be achieved using error correction coding.

Figure 8:
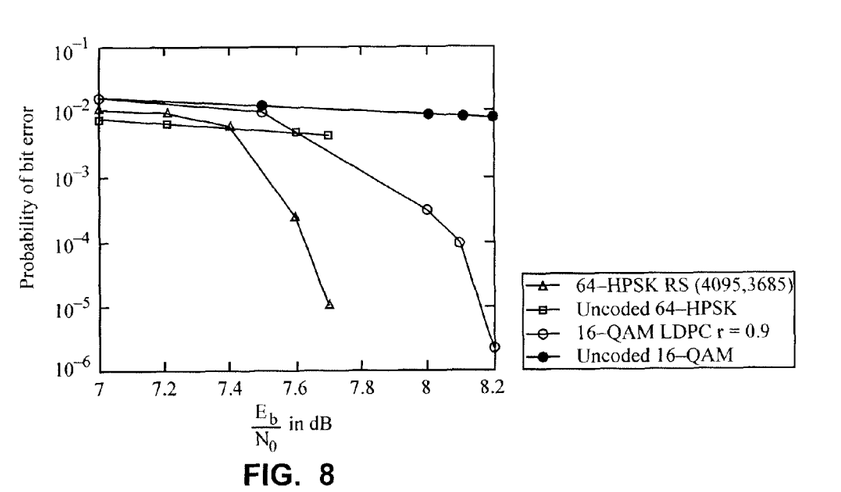
FIG. 8 graphically illustrates the Monte Carlo simulation results for 64-HPSK and 16-QAM using error correction coding in accordance with one embodiment.
Figure 9:
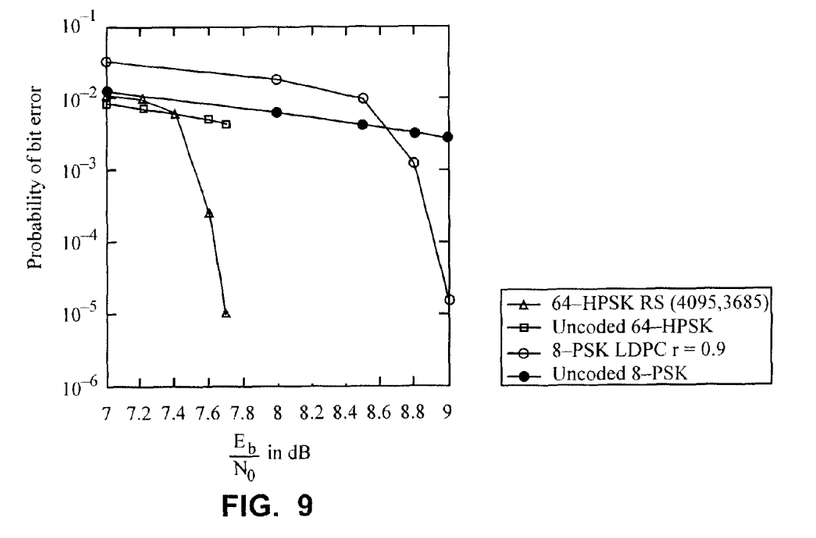
FIG. 9 graphically illustrates the Monte Carlo simulation results for 64-HPSK and 8-PSK using error correction coding in accordance with one embodiment.

FIG. 8 shows the Monte Carlo simulation results for 64-HPSK and 16-QAM using error correction coding. The tremendous improvements in probability of bit error shown by 64-HPSK over 16-QAM are obtained at the same spectral efficiency. FIG. 9 shows the Monte Carlo simulation results for 64-HPSK and 8-PSK using error correction coding. The tremendous improvements shown by 64-HPSK over 8-PSK are obtained both in terms of probability of bit error and spectral efficiency.

Figure 10:
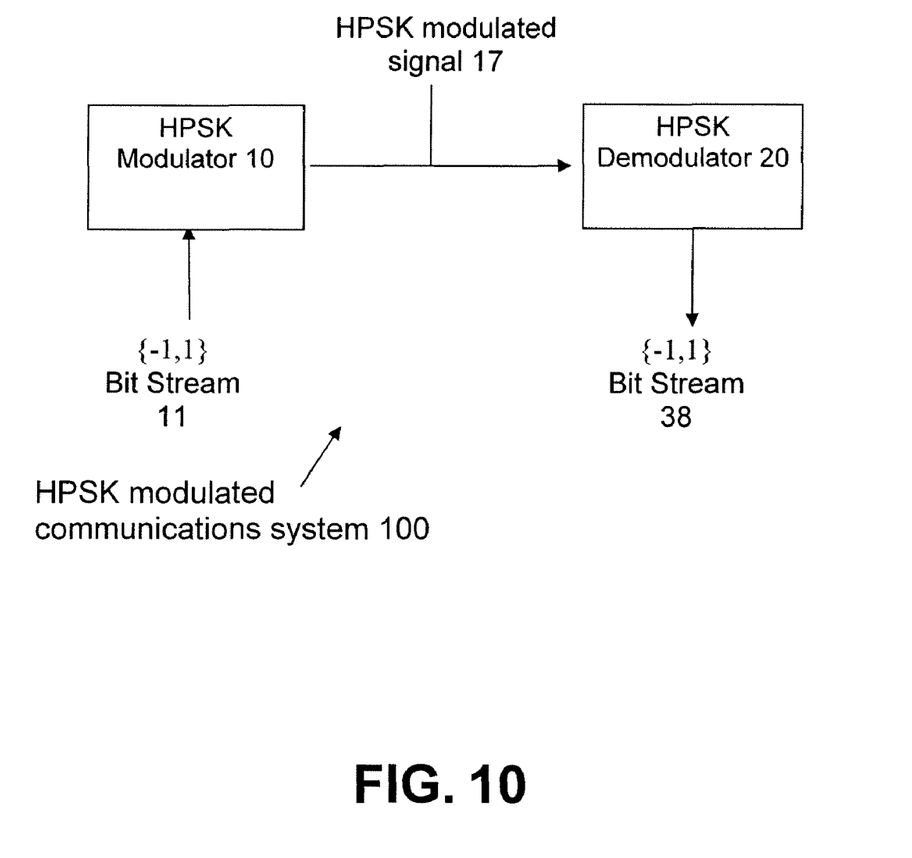
FIG. 10 illustrates a HPSK modulated communications systems in accordance with one embodiment.

FIG. 10 illustrates an HPSK modulated communications system 100 in accordance with one embodiment. In one embodiment, HPSK modulated communications system 100 includes an HPSK modulator 10 earlier described that receives an input signal 11. HPSK modulator 10 generates and transmits an HPSK modulated signal 17 as earlier described herein over a transmission channel. In one embodiment, HPSK modulated signal 17 is received by HPSK demodulator 20 and demodulated to obtain an output signal 38 as earlier described herein.

What is claimed is:

1. A communications system comprising:
a modulator arranged to receive a bit stream of binary data input thereto, the modulator comprising:
a signal generator arranged to generate four orthonormal hyper phase shift keying (HPSK) basis functions that are periodic functions having with a duration T, and
a bit to symbol mapper for combining the bit stream and the HPSK basis functions to form a succession of 4-bit HPSK symbols for 16-HPSK, 5-bit HPSK symbols for 32-HPSK, and 6-bit HPSK symbols for 64-HPSK;
a transmitter connected to the bit to symbol mapper and arranged to receive the HPSK symbols and to transmit signals indicative of the HPSK symbols;
a receiver arranged to receive the signals indicative of the HPSK symbols from the transmitter; and
a demodulator connected to the receiver and arranged to demodulate the HPSK symbols with the HPSK basis functions and reproduce the bit stream of binary data, wherein the HPSK basis functions are $$\phi_1(t) = \frac{A}{\sqrt{E_s}}\cos(2\pi(f_c + 1/(2T))t)$$

$$\phi_2(t) = \frac{A}{\sqrt{E_s}}\sin(2\pi(f_c + 1/(2T))t)$$

$$\phi_3(t) = \frac{A}{\sqrt{E_s}}\sin(2\pi(f_c - 1/(2T))t)$$

$$\phi_4(t) = \frac{A}{\sqrt{E_s}}\cos(2\pi(f_c - 1/(2T))t)$$

where A is the amplitude and $$E_s = \frac{A^2 T}{2}$$

is the energy per symbol.

2. The communications system of claim 1 wherein the data input to the modulator is a serial bit stream, the HPSK modulator further comprising:
a serial to parallel converter arranged to provide a parallel bit stream to the bit to symbol mapper.

3. The communications system of claim 2 wherein the demodulator comprises:
four correlators for correlating each received HPSK symbol with the four HPSK basis functions.

4. The communications system of claim 3 wherein the demodulator further comprises:
a sampler that samples signals output from the correlators at time intervals equal to the duration T of the basis functions.

5. The communications system of claim 4, wherein the demodulator further comprises:
a minimum Euclidean distance detector arranged to and estimate which of the correlator output signals is closest to the signal received by the receiver.

6. A method for transmitting digital information comprising:
arranging a modulator to receive a bit stream of binary data input thereto;
providing a signal generator arranged to generate four orthonormal hyper phase shift keying (HPSK) basis functions that are periodic functions with a duration T;
forming the HPSK basis functions as $$\phi_1(t) = \frac{A}{\sqrt{E_s}}\cos(2\pi(f_c + 1/(2T))t)$$

$$\phi_2(t) = \frac{A}{\sqrt{E_s}}\sin(2\pi(f_c + 1/(2T))t)$$

$$\phi_3(t) = \frac{A}{\sqrt{E_s}}\sin(2\pi(f_c - 1/(2T))t)$$

$$\phi_4(t) = \frac{A}{\sqrt{E_s}}\cos(2\pi(f_c - 1/(2T))t)$$

where A is the amplitude and $$E_s = \frac{A^2 T}{2}$$

is the energy per symbol;
providing a bit to symbol mapper according to Table 1, Table 2, or Table 3 for combining the bit stream and the HPSK basis functions to form a succession of 4-bit HPSK symbols for 16-HPSK, 5-bit HPSK symbols for 32-HPSK, or 6-bit HPSK symbols for 64-HPSK;

connecting a transmitter to the mapper and arranging the transmitter to transmit signals indicative of the HPSK symbols;

providing a receiver arranged to receive the signals indicative of the HPSK symbols from the transmitter; and demodulating the HPSK symbols with the HPSK basis functions to reproduce the bit stream of binary data.

7. The method of claim 6 wherein the data input to the modulator is a serial bit stream, the method further comprising:

providing a serial to parallel converter arranged to provide a parallel bit stream to the bit to symbol mapper.

8. The method of claim 6 further comprising:

forming the demodulator to include four correlators for correlating each received HPSK symbol with the four HPSK basis functions and able to decode error correction codes.

9. The method of claim 6 further comprising:

sampling signals output from the correlators at time intervals equal to the duration T of the basis functions.

10. The method of claim 6 further comprising: providing a minimum Euclidean distance detector arranged to and estimate which of the correlator output signals is closest to the signal received by the receiver.

\* \* \* \* \*